June 22, 1954      P. H. TAYLOR      2,681,800
SPRING UTILIZING A COMPRESSIBLE SOLID
Filed Feb. 21, 1952
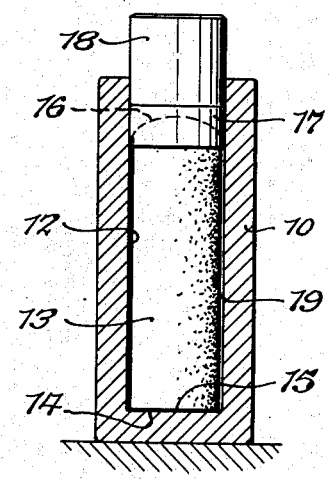
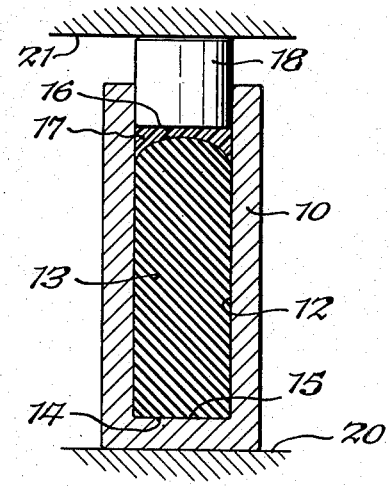
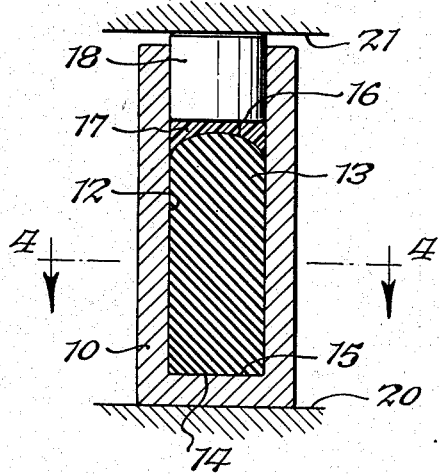
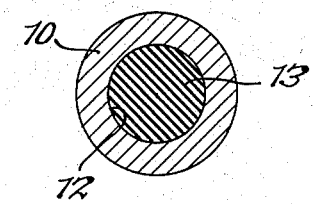
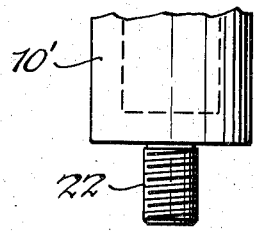
INVENTOR.
Paul H. Taylor
BY
Attorney.

Patented June 22, 1954

2,681,800

UNITED STATES PATENT OFFICE 2,681,800

SPRING UTILIZING A COMPRESSIBLE SOLID

Paul H. Taylor, Grand Island, N. Y., assignor to Wales-Strippit Corporation, North Tonawanda, N. Y., a corporation of New York Application February 21, 1952, Serial No. 272,878

11 Claims. (Cl. 267—63)

The present invention relates to springs, and more particularly to springs which make use of the compressibility of solids to achieve their purposes.

Various types of springs are known. Mechanical springs are the most common but fluid springs are also used, either liquid or combined liquid and gas.

Mechanical springs are conventionally made either of steel wire coiled on itself or of steel plates in the form of leaves. While satisfactory for many purposes, each type of mechanical spring has definite disadvantages in many applications. For instance, in automotive use, coil springs are more compact than leaf springs, and provide a more uniform and constant spring rate for the space available above the axle on any particular vehicle, but they have the disadvantage that because of their relative instability in all directions the vehicle wheels must be supported by some means other than the springs, which in themselves cannot be used for supporting the wheels against any of the displacing forces to which they are subjected. The leaf spring, on the other hand, while satisfactory for laterally stabilizing a vehicle wheel, is generally unsatisfactory for springing the wheel because its rate of springing is generally stiffer than that of the coil spring. Moreover, the leaf spring raises the vehicle chassis and center of gravity because of its space requirements. In addition, the interleaf friction between the various leaves of a leaf spring varies according to the climate, dampness, etc., varying the spring rate so that the ride is not nearly as predictable as in the case of coil springs. Both of these types of springs influence the ride of the vehicle in that they are part of the unsprung weight and therefore constitute that part of the ratio of the sprung to unsprung weight which governs the riding qualities of any particular vehicle.

In aircraft suspension systems, weight is the primary consideration. Therefore spring systems must be chosen by virtue of the weight penalty they add to the aircraft rather than their relative costs or advantages. While in some instances coil or leaf springs have been used, notably leaf springs because they can be used for guiding the wheel as well as supporting it, whereby some weight penalty is avoided, none of the mechanical springs are particularly desirable, because the weight penalty is of necessity high. For this reason it is customary in aircraft landing gear to employ air under compression over a liquid and to utilize for its dampening means the flow of the liquid through a varying orifice which is so restricted as to slow down the travel of the wheel at certain portions of the stroke of the landing gear. There have also been developed for aircraft, liquid springs which utilize the limited compressibility of liquids whereby the weight penalty is reduced.

Still another field, in which existing spring limitations of necessity limit the work which can be done, is the metal working art or machine tool field. Springs are used in this field, for instance, to strip parts from dies, or to strip punches from the metal in which they are lodged, or to supply pressure to some area of a workpiece while it is otherwise being worked upon, etc. In the machine tool industry the difficulty with the existing springs is that they do not provide sufficient power for the available space. For instance, in the well-known perforating implements manufactured by the assignee of the present application (see Patent No. 1,955,866), the design and use of the punch is limited by the size of the spring which can be utilized therein.

Where mechanical springs are employed, for instance, there are highly objectionable limitations imposed with respect to the thickness and character of the material which may be punched or perforated, since the capacity of the punch is dependent upon the capacity of the stripping apparatus to withdraw the punch from the work after the punching or perforating stroke. Because of these limitations it has been impractical heretofore, for example, to perforate metal stock substantially over one quarter inch thick. It has also been impractical to exceed a hole diameter much larger than two inches without using costly stripping apparatus. In the case of large punches, moreover, a large mechanical spring surrounding the punch is unsatisfactory for stripping because for the large diameters the size of spring wire required provides a soft spring which has insufficient stripping capacity unless preloaded to a substantial degree; and preloading of itself is objectionable since it imposes severe stresses on the punching and stripping apparatus.

The use of mechanical springs for stripping purposes has other objections, too, a serious one being that such springs require considerable space and hence increase the height of the punch column. They also add to the width of the assembly and thereby prevent the forming of holes as close together as in many instances is desirable. Mechanical springs have the further objection that they are subject to fatigue and breakage, particularly if the ram of the press by which the movable element of the punch, or perforating, assembly, is actuated, is permitted to over-travel to an extent such as to cause bottoming upon one another of the various convolutions of the springs.

For these reasons liquid springs have been devised as substitutes for mechanical springs. In liquid springs, a container is provided that is filled with liquid and the liquid is compressed and reduced in volume during the working stroke of the punch, for instance, so that upon completion of the working stroke the liquid is permitted to expand to withdraw the punch from the workpiece being perforated while returning the punch to a retracted position.

Liquid springs are capable of carrying much greater loads than mechanical springs of the same size. Hence, it is possible with liquid springs of practical size in a single set-up to punch or perforate material of much greater thickness and of much closer hole spacing than can be handled practically with mechanical springs.

In order that liquid springs function properly, however, the liquid must be sealed in the chamber so that it cannot leak out of the chamber during the working stroke. Since the compressibility utilized is often less than ten percent by volume, and the volume in the most common size is less than two ounces, the loss of a few drops of liquid renders the spring unusable. Liquid springs are, therefore, extremely critical with respect to the sealing of the liquid at the high pressures normally encountered in the application of such springs. The interference between the seal and the piston or other part moving therethrough must be held to very close tolerances in the order of .0002 inch to .0004 inch. This means that the mating parts must be held to a .00001" tolerance to provide this interference. The close machine work required of necessity imposes limitations on the production of such springs and adds to the cost thereof. With a liquid spring, moreover, if the wall of the cylinder or other container for the liquid is porous, or develops a crack, the liquid leaks and the spring fails.

Still another difficulty with liquid springs is that spring pressure varies substantially with changes in temperature. For instance in some applications, a change in temperature of 100° F. will completely eliminate the force from the spring because of the reduction in volume of the liquid. This is, of course, a serious drawback say, for instance, in aircraft use where the operating temperatures may vary as much as 150° to 200° in normal operation.

A primary object of the present invention is to provide a spring which utilizes the compressibility of solids and which has all the advantages of a liquid spring over a mechanical spring but which avoids the drawbacks of liquid springs.

Another object of the invention is to provide a spring in which a solid plastic material is used in place of the low viscosity liquids normally employed in liquid springs.

Another object of the invention is to provide a spring of the character described using a compressible solid plastic as the compressible medium and in which the plastic is distorted elastically without volume change under preload and in which there is a high end load by virtue of the reduction in volume or compressibility of the material used.

Still another object of the invention is to provide a spring employing a compressible solid material in which a failure of the cylinder wall or a slight porosity therein does not necessarily result in failure of the spring.

Another object of the invention is to provide a very compact spring which is simple and rugged in construction and which is subject to a minimum degree to fatigue, and which will have an extremely long life.

Another object of the invention is to provide a spring which is relatively low in cost, simple to manufacture, and which has no real maintenance problems.

Another object of the invention is to provide a spring utilizing a compressible solid material, in which normal ranges of temperature are by no means as critical as they are in liquid springs.

Another object of the invention is to provide a spring for vehicular use which has the stabilizing effect of a leaf spring with the soft spring rate of the coil spring and is a fraction of the weight of either of them, thereby reducing the unsprung weight.

A related object of this invention is to provide a spring for vehicles in which the chamber or heavy portion of the spring can be supported on the structure, and therefore is a part of the sprung weight, and the piston and compressible material are the only unsprung weight.

Another object of this invention is to provide a spring utilizing a compressible material which avoids the weight penalty of steel springs in air craft use and yet provides the maintenance-free characteristics of the steel spring.

Other objects of the invention will be apparent hereinafter from the specification and from the recital of the appended claims.

In the drawing:

Fig. 1 is an axial sectional view of a spring utilizing a compressible solid and constructed according to one embodiment of this invention, and showing the spring in unloaded condition;

Fig. 2 is a similar section showing the spring under light load, utilizing the elasticity of the material, before compressibility begins.

Fig. 3 is a similar section showing the spring under full working load at the end of a working stroke of the parts between which it is interposed, with its material compressed in volume;

Fig. 4 is a section on the line 4—4 of Fig. 3 looking in the direction of the arrows; and Fig. 5 is a fragmentary side view of an alternative construction in which the spring has a threaded end to anchor it in place.

In a spring constructed according to the present invention a compressible medium is employed in the form of a column or body in a solid state. Preferably plastic, such as a dense and hard silicone is used, although other solids, such as Lucite, polystyrene, cellulose acetate, nylon, etc. can be employed also, depending on the loads desired. The material is placed within a hollow container which is closed at one end and has a piston mounted to reciprocate in its other, open end. The container seats at its closed end against one of the two relatively movable parts, between which the spring is interposed, and the piston contacts the other of said parts. The spring is used under pre-load so that for a light preload the material is distorted to fill the container. When a working load is applied to the spring, then, the material is compressed to absorb the load, and to return the piston, by increase in volume again, when the load is relieved.

While not possessing the resiliency of liquid, materials, such as specified, nevertheless possess sufficient resiliency so that they can be used particularly in many heavy load spring applications such as have been discussed. Furthermore, while the use of a solid compressible and/or elastic material necessarily imposes limitations on the design of the chamber or container therefor, the spring of the present invention does not have the difficult sealing problem attendant upon the use of a liquid, since the tendency of a solid to extrude past a gap in the seal is much less than the tendency of liquid to pass a seal. Liquid wets the cylinder wall and some unavoidably escapes past the seal in the operation of the spring whereas the solid material tends to maintain itself as a homogeneous mass if ordinary precautions regarding use of the material in a spring are taken.

Referring now to the drawing by numerals of reference, the spring shown comprises a cylindrical receptacle 10 having a cylindrical bore 12, and adapted to contain a cylindrical column 13 of a solid plastic material of high compressibility, such as hard silicones, polystyrene, etc.

The column 13 has a plane bottom surface 14 which seats on the plane bottom 15 of the chamber 10. The column 13 has a spherical upper end on which is mounted a solid seal 17 made of extra-tough structural nylon or other suitable plastic. The seal 17 is elastic and compressible but less elastic and less compressible than the plastic column 13. The seal 17 has a concave spherical under-surface to fit the convex spherical upper end of the column 13. A piston 18 made of a metal sufficiently strong to withstand the pressures involved, preferably steel or brass, tops the assembly and has a plane under face resting upon the plane upper face of the seal 17.

Fig. 1 shows the parts in unloaded condition. The column 13 of plastic material is normally smaller in diameter than the inside diameter of the bore of the receptacle 10 so that there is a clearance 19 between the column 13 and the inside wall 12 of the receptacle when the spring is completely at rest without load. The seal 17, however, has a tight fit within the bore 12, and preferably may even be normally slightly larger in diameter than the bore 12 so that it requires compression in order to insert it in the bore.

Fig. 2 shows the spring under preload. Here the spring is interposed between two parts movable relatively toward and from one another, such as the bed 20 and the ram 21 of a press. The spring is dimensioned so that when the ram is in withdrawn position the spring will still be sufficiently preloaded as to cause the piston 18 and seal 17 to exert sufficient pressure on the column 13 of plastic material to distort the column 13 and cause the material, which is somewhat elastic, to fill the bore 12 of the container.

Preload of the spring occurs, therefore, through distortion of the plastic which is the standard way in which rubber is customarily used as an elastic spring material. In the spring of the present invention preload follows customary practice in that energy is absorbed in the plastic by distorting the column 13 from its normal shape. Of necessity this distortion produces a light load because distortion within the elastic limit of the material provides very low forces.

Fig. 3 shows what happens when the piston 18 has been driven further into the bore of the container 10 by the downstroke of the ram 21. Since the plastic under preload completely fills the inside of the chamber 10, the further motion of the ram 21 must effect compression of the molecules of the plastic to such a point that the volume of the column 13 is actually reduced. It has been found that in the case of hard silicone a net reduction of approximately 6% can be expected along with an internal pressure of 20,000 p. s. i. in the plastic. This, in turn, provides roughly a force of approximately 8,000 lbs. on a ¾" piston, which can be utilized for resilient action.

While other materials than hard silicones may be utilized in a spring made according to this invention, it is economically desirable to use materials having the greatest compressibility, such as the hard silicones which, as stated, have a minimum compressibility of about 6%. In addition, there is another reason for using silicones, that is, in operation of any spring made according to the present invention, the working of the solid material therein will of necessity produce heat. Silicones have a natural resistance to high heat and their use in a spring of the character herein described is particularly advantageous because silicones do not deteriorate from heat, and heat does not have any deleterious effects on such materials even in the presence of the lubricants used.

The seal is preferably made of nylon or a similar material, when a silicone solid is used in the spring, because it has been found that the silicones tend to cause seizure and scoring when they get between relatively movable parts made of ferrous materials, whereas nylon remains unaffected.

The spring of this invention may be disposed, as shown in Figs. 1 to 3 between two relatively movable parts, or the container may be provided with means for securing it to one of such parts. Thus, as shown in Fig. 5, a container 10' may be employed having a threaded stud 22 integral therewith which may be threaded into one of the parts between which the spring is interposed to anchor the spring in place. Such a construction is customarily used in die work. It may also be employed for vehicle or aircraft use, it being interesting to note that longer strokes can be obtained by use of a longer cylinder and a longer compressible solid.

While the invention has been illustrated in connection with the embodiment thereof in a press, it will be obvious that the spring of this invention may be employed in various applications where it is desired to resiliently support one part upon another or it is desired to use resilient means for returning one part after movement of that part toward another. The device of the present invention is particularly useful where conventional mechanical springs formed of steel wire or steel leaves provide insufficient power, and yet where the cost of liquid springs is prohibitive. The invention has application, however, wherever mechanical springs are at present employed.

While the invention has been described in connection with particular embodiments thereof and particular uses therefor, then, it will be understood that it is capable of further modification and use, and that this application is intended to cover any variations, uses, or adaptations of the invention following, in general, the principles of the invention and including such departures from the present disclosure as come within known or customary practice in the art to which

Having thus described my invention, what I claim is:

1. A spring comprising a hollow container having a chamber therein which is closed at one end and open at its other, a piston reciprocable through the open end of said chamber, and a compressible, solid, plastic member made of a hard, dense silicone interposed between said piston and the closed end of said chamber, said spring being adapted to be preloaded for use so that said plastic member is distorted elastically to fill said chamber, whereby under further working load the volume of said plastic member is reduced to store energy for returning said piston to its initial position upon release of said working load.

2. A spring comprising a hollow container having a chamber therein which is closed at one end and open at its other, a piston reciprocable through the open end of said chamber, a compressible, solid, plastic member in said chamber for constantly urging said piston outwardly of said chamber, said plastic member seating at one end against the closed end of said chamber, and a solid sealing member interposed between the other end of said plastic member and said piston to prevent extrusion of said plastic member through the open end of said chamber, said other end of said plastic member being spherical in shape, and said sealing member having a complementarily spherically-shaped face to seat on said other end of said plastic member, said sealing member completely filling the space in said container between said piston and said solid member, and said spring being adapted to be used under preload, said solid member under such preload filling completely the space in said chamber between said sealing member and the closed end of said chamber, whereby upon movement of said piston inwardly of said chamber under working load said plastic member is compressed and reduced in volume to store energy for returning said piston to initial position upon release of said working load.

3. A spring comprising a hollow container having a cylindrical chamber therein which is closed at one end and open at its other end, a piston reciprocable through the open end of said chamber, and having a plane inner face, a solid, cylindrical, plastic member for constantly urging said piston outwardly of said chamber, said plastic member seating at one end against the closed end of said chamber and having its other end spherical in shape, and a solid, structural plastic sealing member for preventing extrusion of said plastic member through the open end of said chamber, said sealing member having at one side a spherical face complementary to and seated on said other end of said plastic member and having at its other side a plane face seated against the plane inner face of said piston, said spring being adapted to be preloaded for use so that said plastic member fills said chamber, whereby under further working load said plastic member is compressed and reduced in volume to store energy for returning said piston to initial position upon release of said working load.

4. A spring utilizing the compressibility of solids, comprising a chamber closed at one end, a piston reciprocable in said chamber, a compressible plastic interposed between said piston and the closed end of said chamber and adapted to be reduced in volume on movement of said piston in one direction in said chamber to return said piston when the pressure is released, a second plastic interposed between the first-named plastic and said piston to seal said first-named plastic in said chamber, said second plastic being compressible and elastic but less compressible and less elastic than said first-named plastic.

5. A spring comprising a container having a chamber which is completely closed at one end and which is open at its other end, a piston reciprocable in the open end of said chamber, a compressible plastic solid member disposed in said chamber between said piston and the closed end of said chamber, and a solid seal disposed between said piston and said solid member and completely filling the space in said chamber between said piston and said solid member, said spring being adapted to be used under preload, and said solid member under such preload filling completely the space in said chamber between said seal and the closed end of said chamber, whereby upon movement of said piston inwardly of said chamber under working load said solid member is compressed and reduced in volume to store energy for returning said piston to initial position upon release of said working load.

6. A spring comprising a container which is formed with a chamber that is open at one end and closed at its other end, a piston reciprocable in the open end of said chamber, a compressible solid member disposed in said chamber between said piston and the closed end of said chamber and being of less initial diameter than said chamber, said compressible solid member having at least the elasticity and compressibility properties of a hard silicone plastic, whereby upon inward movement of said piston in said chamber said compressible solid member is initially elastically distorted to fill the space in said chamber between said piston and the closed end of said chamber, to provide a low preload after which upon further inward movement of said piston said compressible member will be reduced in volume to provide a high end load.

7. A spring comprising a container provided with a chamber that is open at one end and closed at its other end, a solid, non-distortable piston and an elastic and compressible seal reciprocable in the open end of said chamber, a compressible solid member disposed in said chamber between said seal and the closed end of said chamber and being of less initial volume than the space in which it is disposed, said compressible solid member having at least the elasticity and compressibility properties of a silicone plastic, whereby upon inward movement of said piston in said cylinder said compressible member is initially elastically distorted to fill said space to provide a low preload after which, upon further movement of said piston, said compressible member will be reduced in volume to provide a high end load.

8. A spring comprising a container having a chamber which is completely closed at one end and which is open at its other end, a piston reciprocable in the open end of said chamber, a compressible solid member disposed in said chamber between said piston and the closed end of said chamber, said solid member being made of a solid plastic which is compressible and which is selected from the group of solid plastics comprising silicone, polystyrene, cellulose acetate, and nylon, and a solid seal disposed between said piston and said solid member and completely filling the space in said chamber between said piston and said solid member, said spring being adapted to be used under preload, and said solid member under such preload filling completely the space in said chamber between said seal and the closed end of said chamber, whereby upon movement of said piston inwardly of said chamber under working load said solid member is compressed and reduced in volume to store energy for returning said piston to initial position upon release of said working load.

9. A spring comprising a container having a chamber which is closed at one end, a piston reciprocable in said chamber, a compressible solid plastic member disposed in said chamber between said piston and the closed end of said chamber, and a solid plastic sealing member disposed between said piston and the first-named solid member and completely filling the space in said chamber between said piston and said first-named solid member, said spring being adapted to be used under preload, and said first-named solid member under such preload filling completely the space in said chamber between said sealing member and the closed end of said chamber, whereby, upon movement of said piston toward the closed end of said chamber under working load, said first-named solid member is compressed and reduced in volume to store energy for returning said piston to initial position upon release of said working load, said sealing member being compressible but less compressible than said first-named solid member.

10. A spring comprising a container having a chamber which is closed at one end, a piston reciprocable in said chamber, a compressible solid plastic member disposed in said chamber between said piston and the closed end of said chamber, and a solid plastic sealing member disposed between said piston and the first-named solid member and completely filling the space in said chamber between said piston and said first-named solid member, said spring being adapted to be used under preload, and said first-named solid member under such preload filling completely the space in said chamber between said sealing member and the closed end of said chamber, whereby, upon movement of said piston toward the closed end of said chamber under working load, said first-named solid member is compressed and reduced in volume to store energy for returning said piston to initial position upon release of said working load, said sealing member being made of nylon, and said first-named solid member being a silicone.

11. A spring comprising a container having a chamber which is closed at one end, a piston reciprocable in said chamber, a compressible solid plastic member disposed in said chamber between said piston and the closed end of said chamber, and a solid plastic sealing member disposed between said piston and the first-named solid member and completely filling the space in said chamber between said piston and said first-named solid member, said spring being adapted to be used under preload, and said first-named solid member under such preload filling completely the space in said chamber between said sealing member and the closed end of said chamber, whereby, upon movement of said piston toward the closed end of said chamber under working load, said first-named solid member is compressed and reduced in volume to store energy for returning said piston to initial position upon release of said working load, said sealing member being compressible but less compressible than said first-named solid member, said sealing member being also elastically distortable and being of larger normal diameter than the diameter of said chamber whereby it must be compressed to fit into said chamber and having a low coefficient of friction whereby the interference fit between said cylinder and said seal will not create high friction losses.

References Cited in the file of this patent

UNITED STATES PATENTS

| Number | Name | Date |
|---|---|---|
| 57,647 | Wilder | Aug. 28, 1866 |
| 853,548 | Herz | May 14, 1907 |
| 1,461,091 | Henley | July 10, 1923 |
| 2,356,563 | Bingham | Aug. 22, 1944 |
| 2,460,116 | Bazley | Jan. 25, 1949 |
| 2,503,143 | Wasdell | Apr. 4, 1950 |
| 2,570,854 | Pierce | Oct. 9, 1951 |

FOREIGN PATENTS

| Number | Country | Date |
|---|---|---|
| 105,053 | Great Britain | Mar. 21, 1917 |